Figure 1:
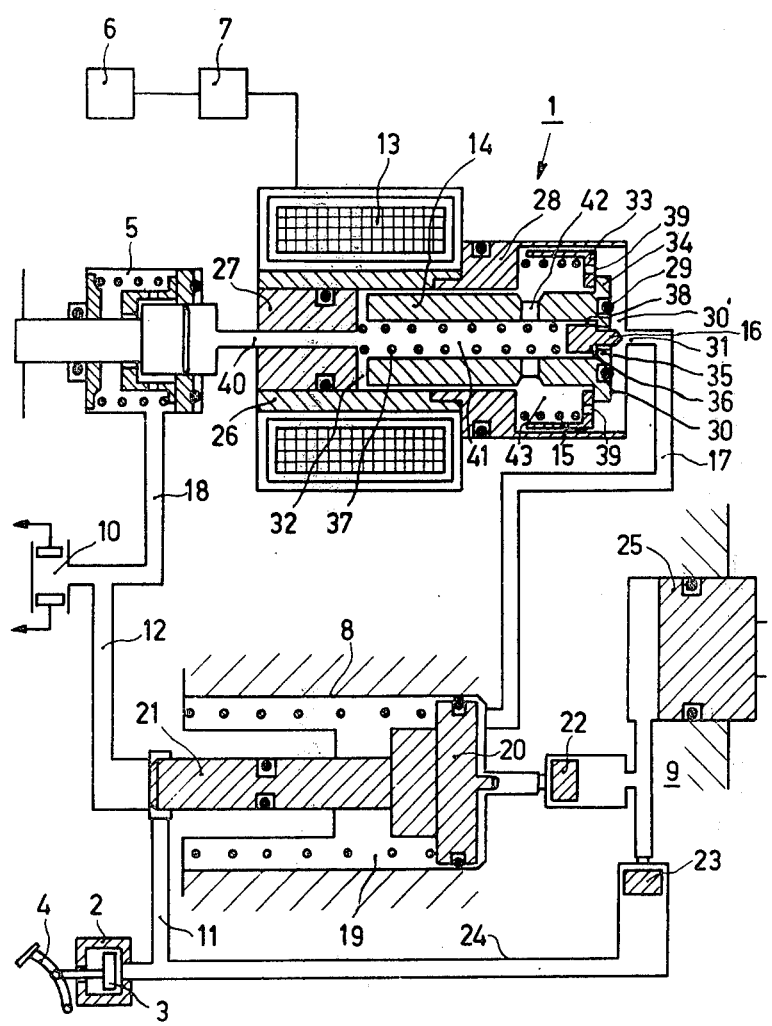

United States Patent [19]

Skoyles

[11] 4,120,317
[45] Oct. 17, 1978

[54] ANTI-LOCK VEHICLE BRAKE SYSTEMS

[75] Inventor: Derek Robert Skoyles, Salfords, near Redhill, England

[73] Assignee: U.S. Philips Corporation, New York, N.Y.

[21] Appl. No.: 661,987

[22] Filed: Feb. 27, 1976

Related U.S. Application Data

[63] Continuation of Ser. No. 366,307, Jun. 1, 1973, abandoned.

[30] Foreign Application Priority Data

May 11, 1973 [GB] United Kingdom ............... 28586/73

[51] Int. Cl.² ............................................ F16K 31/06
[52] U.S. Cl. ................................ 137/509; 137/630.19; 137/614.18; 251/139
[58] Field of Search ....................... 137/630.22, 614.18, 137/614.19, 630.19, 509; 251/210, 139

[56] References Cited

U.S. PATENT DOCUMENTS

| 3,321,177 | 5/1967 | Fendel et al. | 251/210 |
| 3,344,807 | 10/1967 | Lehrer et al. | 137/630.19 X |
| 3,431,028 | 3/1969 | Yoder | 137/513.5 X |
| 3,446,246 | 5/1969 | Huley | 251/139 X |

FOREIGN PATENT DOCUMENTS

| 1,928,734 | 6/1969 | Fed. Rep. of Germany | 251/210 |
| 833,198 | 3/1952 | Fed. Rep. of Germany | 137/630.22 |
| 1,012,005 | 4/1952 | France | 251/139 |

Primary Examiner—Arnold Rosenthal
Attorney, Agent, or Firm—Frank R. Trifari; Robert S. Smith

[57] ABSTRACT

A solenoid valve mechanism includes a cooperating poppet and valve seat and a first bias spring for urging the poppet into sealing engagement with the valve seat. A solenoid armature carries the poppet and includes means for selectively urging the poppet against the spring bias. A solenoid coil cooperates with the solenoid armature and the armature is provided with a fluid seal and a second bias spring for urging the armature into position at which the fluid sealing means forms a fluid seal around the valve member. The fluid seal includes a path for bleeding fluid across the valve seat.

2 Claims, 3 Drawing Figures

ANTI-LOCK VEHICLE BRAKE SYSTEMS

This is a continuation of application Ser. No. 366,307, filed June 1, 1973 now abandoned.

This invention relates to anti-lock brake systems for wheeled vehicles, that is, brake systems including means for improving braking performance of a vehicle by relieving braking pressure applied to a road wheel of the vehicle if the wheel tends to look following brake application and then increasing the braking pressure again without the need for any change in the actual braking action (by a person using the brake) causing the brake application. Such brake systems can be successful in reducing the risk of skidding due to wheel lock and in maintaining directional control during braking, and can also reduce braking distances.

The invention relates more particularly to a fluid-pressure operated anti-lock vehicle brake system of the character comprising, for use in conjunction with a vehicle wheel and associated wheel brake, a fluid pressure source which in response to a braking action provides fluid under pressure via a fluid pressure connection to the brake, said fluid under pressure being effective to cause the brake to produce braking pressure at said wheel, a solenoid valve mechanism, wheel movement sensing means for producing an output function for causing actuation of the solenoid valve mechanism when a particular criterion related to wheel rotational movement obtains, and a relief connection interconnected with said fluid pressure connection or with the brake and adapted to be opened by said solenoid valve mechanism when the latter is actuated, to allow displacement of fluid from said fluid pressure connection or from the brake into said relief connection whereby to cause a reduction in the pressure of such fluid and thereby relieve braking pressure. A preferred criterion for causing actuation of the solenoid valve mechanism is when wheel slip exceeds a chosen value.

An anti-lock vehicle brake system of the above character may be either of the master cylinder type in which fluid in a master cylinder is pressurised by a piston, when a braking action takes place, to pressurise fluid in said fluid pressure connection, or of the continuously pumped type in which fluid under pressure is available continuously in the brake system and is "modulated" by a braking action such that the pressurized fluid is applied through said fluid pressure connection to the brake to an extent determined by the extent of modulation. Also, the braking action causing movement of the master cylinder piston or of the brake modulator, as the case may be, may be with or without servo or amplifier assistance. Having regard to the above, the term "fluid pressure source" as used in this specification is to be construed accordingly.

The wheel movement sensing means can comprise a mechanical inertia sensor or the combination of a transducer for producing an electrical pulse train which is a function of wheel speed and an electronic control circuit for processing said electrical pulse train.

A separate system of the above character (with a common fluid pressure source) can be provided in respect of each road wheel of a vehicle, but it would also be possible to provide a single system for the two (rear) wheels driven by a vehicle transmission shaft with sensing means associated with the shaft for producing said output function. As another alternative, a single system may be provided in common for all the road wheels of a vehicle. In this case, each road wheel would have its own wheel movement sensing means and any of the latter would provide said output function to actuate the anti-lock control valve when the appertaining wheel tends towards a locked condition.

Normally, in an anti-lock vehicle brake system of the above character, the period during which the solenoid valve mechanism is held actuated to relieve braking pressure is very short (i.e. only a small fraction of a second), and the solenoid valve mechanism is released at the end of the period to allow braking pressure to increase again. This normal antilock operation to relieve braking and then to allow it to increase again is repeated each time the wheel tends towards a locked condition during a braking action.

This function of the solenoid valve mechanism to relieve braking pressure when it is actuated can introduce into the system a possible drawback in that if due to a fault in the mechanism an orifice which it controls is partially open and thereby leaks at a fluid pressure above a certain minimum value when initial brake application occurs, fluid pressure at the brake would be limited to that minimum value, which might be insufficient to achieve effective braking. This is a potentially dangerous fault against which the system may not be protected by a fail-safe arrangement therein which affords fail-safe protection against a permanently energised solenoid valve mechanism (e.g. a fail-safe arrangement such as described in co-pending U.S. patent application Ser. No. 366,189 filed July 1, 1973. and which relies on the priority of U.K. patent application No. 28585/72, because it is probable that such a fail-safe arrangement would already be rendered inoperative in response to such minimum value of fluid pressure.

With a view to achieving a fail-safe protection against such a fault the present invention provides a solenoid valve mechanism comprising a valve member together with a first bias spring for urging said member into sealing engagement with an orifice of the mechanism when the latter is unenergised, and an armature provided with a fluid sealing member together with a second bias spring for urging said armature, when the mechanism is unenergised, into a position at which said fluid sealing member forms a fluid seal around said valve member and thus around said orifice, said armature effectively engaging with said valve member after a limited displacement of the armature from said position by a solenoid force produced on energisation of the mechanism, during which displacement said seal is broken and following which displacement there is further displacement of the armature and thus displacement of said valve member by the armature due to said solenoid force, whereby to open said orifice. Preferably, a restricted fluid path is provided between said armature and said valve member to permit passage of fluid into a region bounded by said fluid seal when the mechanism is unenergised.

The independent sealing of the orifice by the fluid sealing member provided on the armature maintains the orifice almost sealed or sealed in the event that the valve member is not held in sealing engagement with the orifice for any reason, for instance due to the presence of a piece of grit or other minute foreign body at the valve seat of the orifice. As aforesaid, a sufficiently high leakage of fluid through the orifice due to a faulty valve sealing member could prevent a build-up effective fluid pressure at the brake in an anti-lock vehicle brake system of the character referred to. The independent sealing of the orifice in a solenoid valve mechanism according to the present invention provides a fail-safe protection in this circumstance. It is arranged that due to a low fluid pressure within the region bounded by said fluid seal as a result of such fluid leakage, there will exist across an armature part adjacent said region a fluid pressure difference that produces a force far in excess of the solenoid force, so that armature displacement due to solenoid energisation is no longer possible. This inhibits further anti-lock operation until the fault is remedied, but normal braking is unaffected. Said restricted fluid path is provided so that said region is not completely sealed from fluid into the solenoid valve mechanism. This ensures that fluid pressure acting on that region is approximately the same as the pressure of fluid into the solenoid valve mechanism to allow the solenoid force to displace the armature in the presence of a small leakage fault (which the fail-safe action can ignore) at the orifice. When a large leakage fault exists said region is at a much lower fluid pressure so that armature displacement cannot take place, as aforesaid.

Figure 2:
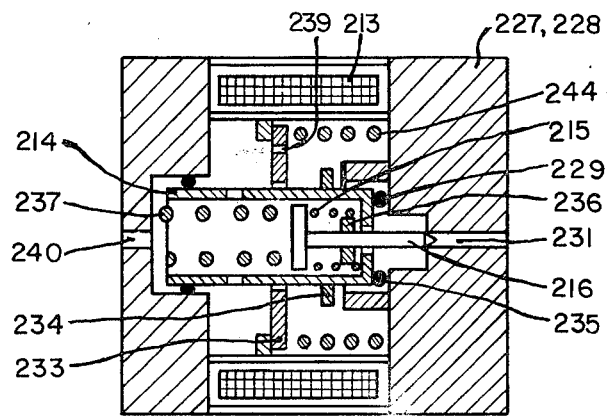
Figure 3:
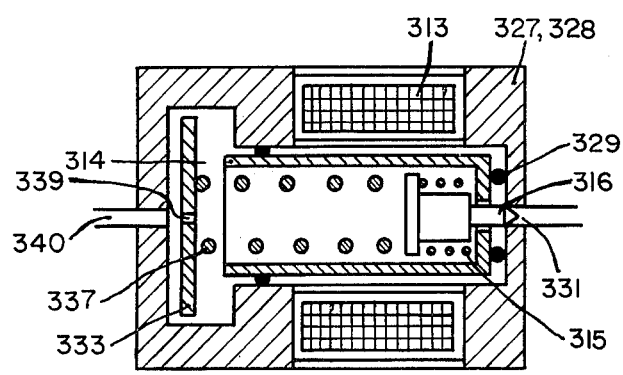

In order that the invention may be more fully understood reference will now be made by way of example to the drawings filed with the Specification of which:

FIG. 1 shows diagrammatically a particular form of anti-lock vehicle brake system of the character referred to including a solenoid valve mechanism conforming to the invention; and FIGS. 2 and 3 show respective further solenoid valve mechanism conforming to the invention.

Referring to the drawings, a solenoid valve mechanism 1 is provided in a particular form of anti-lock vehicle brake system which is described in greater detail than herein in U.S. Pat. No. 3,724,914 which relies on the priority of No. 1,248,787. The diagrammatic figure illustrating the system in that patent is drawn differently from the present FIG. 1. This system is a master cylinder type hydraulic system comprising a master cylinder 2 having a piston 3 which is actuable by a brake pedal 4. The system further comprises a fail-safe arrangement 5, a wheel movement sensor 6, an electronic control circuit 7, a fluid flow control arrangement 8, and a scavenging pump 9. A wheel brake 10, for a vehicle road wheel (not shown), is controlled by the system.

In operation of the system of FIG. 1, for normal brake application, fluid in pressure lines 11 and 12 is pressurized by the master cylinder 2 to an extent determined by a driver's braking action and this produces a corresponding braking pressure in the brake 10. If the driver's braking action causes the road wheel with which the brake 10 is associated to exceed a wheel slip of chosen value, this is detected by the wheel movement sensor 6 and the control circuit 7 and the latter energises the solenoid valve mechanism 1. Details of the manner of operation and composition of the elements 6 and 7 are not thought to be necessary for an understanding of the present invention, but an example is given in co-pending U.S. application Ser. No. 272,776 which relies on the priority of U.K. patent application Nos. 35321/71 and U.S. application Ser. No. 368,953 which relies on the priority of U.K. application and 28587/72.

Another form of control circuit is described in U.S. Pat. No. 3,710,186 which relies on the priority of patent specification No. 1,248,788.

The solenoid valve mechanism 1 has an energising coil or solenoid coil 13 which on energisation attracts an armature 14 to the left (as seen in the drawing) against the force of springs 15 and 37 and the armature 14 carries with it a valve member 16 which thus unseats from a fluid connection 17 as illustrated in the drawing.

As a result of the energisation of the solenoid valve mechanism 1, a fluid path is opened by the latter between the connection 17 and a relief connection 18 at the brake 10, so that fluid under pressure at the brake 10 is displaced through said relief connection 18 to the connection 17 (via the fail-safe arrangement 5 and the energised solenoid valve mechanism 1), thereby relieving braking pressure, this displaced fluid enters a reservoir 19 of the fluid flow control arrangement 8 where it is applied behind a spring-loaded piston 20 and displaces this piston 20 to the left (as seen in the drawing), so that the stem 21 of this piston enters the pressure line 12, thereby restricting flow of fluid through this line from the pressure line 11. Braking pressure is now reduced to an extent determined by the extent of displacement of the piston 20 to the left and thus to the volume of displaced fluid. For normal anti-lock operation the solenoid valve mechanism 1 remains energised for only the short time required to allow the braking pressure to fall sufficiently low for the wheel associated with the brake 10 to recover towards freerolling speed. Once the solenoid valve mechanism 1 is de-energised, the pump 9, which comprises valves 22 and 23 and is returning fluid from the reservoir 19 of the fluid flow control arrangement 8 to the pressure line 11 via a connection 24 gradually removes sufficient fluid from the reservoir 19 for the piston 20 to return under its spring-loading towards its original position to increase progressively the rate of braking pressure build-up. A pump piston 25 of the pump 9 can be driven by the road wheel associated with the brake 10 by means of a shallow cam that rotates with this wheel.

This anti-lock operation of the system is repeated each time the road wheel which it is controlling tends towards a locked condition. The operation of the fail-safe arrangement 5 may be ignored in describing the present invention as it is not relevant thereto, but a detailed description of the construction and mode of operation of this fail-safe arrangement 5 is given in co-pending U.S. application which relies for priority on U.K. patent application No. 28585/72.

From the foregoing description it will be appreciated that if the valve member 16 of the solenoid valve mechanism 1 is not complete sealed when this mechanism is unenergised (due for example to a piece of grit caught in the valve seat), there will be a leakage of fluid through the solenoid valve mechanism when a braking action occurs, this leakage being a function of the value of fluid pressure determined by the extent of the gap at the unseated valve member 16 so that fluid pressure needed to produce braking pressure will be limited to this value, which may be inadequate for effective braking. As previously mentioned, this value of fluid pressure may be sufficiently high to render the fail-safe arrangement 5 inoperative, so that the latter cannot provide fail-safe protection in this circumstance. In order to achieve a normal build-up of fluid pressure in the brake when such a malfunction occurs, the solenoid valve mechanism 1 in accordance with the invention is provided.

Consider how the solenoid valve mechanism 1 in greater detail, the energising coil 13 of this mechanism is of hollow cylindrical shape and is mounted on a brass sleeve 26 which bounds a magnetic structure which is represented generally only by parts 27 and 28. The armature 14, which is of hollow cylindrical form, is located in the hollow interior of the magnetic structure and is displaceable axially therein between a first limit position in which an O-ring 29 at the end face 30 thereof seals a region 30' bounding the orifice 31 of the connection 17, and a second limit position in which the other end face 32 of the armature 14 engages the facing side of the armature structure 27. The armature 14 is urged to the first limit position, when the solenoid valve mechanism is unenergised by the force of spring 15 which acts through a slidable member 33 that engages with a shoulder 34 on the armature. The armature 14 is displaced to the second limit position, when the solenoid valve mechanism is initially energised, by the solenoid (magnetic) force which exceeds the force of the springs 15 and 37. The armature 14 has a second shoulder 35 which, with the armature in the first limit position, is out of engagement with a co-operating shoulder 36 on the valve member 16, but which, as shown, engages with this shoulder 36 to displace the valve member 16 away from the orifice 31 to open the latter, after a limited initial displacement of the armature when the latter is displaced to its second limit position. When the solenoid valve mechanism is unenergised, the valve member 16 is urged into sealing engagement with the orifice 31 by the spring 37 to form a fluid seal at the orifice. There is a small clearance or restricted fluid path between the stem of the valve member 16 and an orifice 38 at the end face of the armature through which it passes so that fluid can enter the region 30' through this small clearance. This permits fluid pressure to be equalized at both ends of the armature 14 when the orifice 31 is sealed. Without this fluid pressure equalization, the sealing by the O-ring 29 would prevent anti-lock action in the presence of a small irrelevant solenoid leak due to the fluid pressure acting on the inlet end of the armature 14.

If the valve member 16 does not seal the orifice 31 when the solenoid valve mechanism 1 is unenergised, a certain value of fluid pressure at the inlet side of the armature 14 will cause leakage of fluid through the unsealed orifice 31. In this circumstance, fluid pressure in the region 30' cannot be equalized to the inlet fluid pressure because this region is in communication with the connection 17 which can only have fluid of lower pressure (i.e. the pressure of fluid in the reservoir 19) therein. Consequently, if the solenoid valve mechanism is now energised, the solenoid force is insufficient to displace the armature 14 to its second limit position due to the fluid pressure difference at opposite ends of the armature. Thus, the armature 14 stays in its first limit position in which the O-ring 29 substantially forms a fluid seal at the orifice 31. There is still a small leakage of fluid through the clearance in orifice 38, but this leakage is insufficient to prevent build-up of fluid pressure at the brake 10 for effective braking — although further anti-lock operation is inhibited.

The solenoid valve mechanism 1 is also of a construction, according to co-pending U.S. application Ser. No. 449,357 filed Mar. 8, 1974 which relies for priority on U.K. patent application No. 32541/71, permitting flow rate control of fluid therethrough. This flow rate control is provided by the member 33 which includes an orifice 39 through which fluid flows when the solenoid valve mechanism is energised. The main passage of fluid through the solenoid valve mechanism is from inlet port 40, through the hollow interior 41 of the armature 14, through a bore 42 in the armature wall into a region 43 in which the member 33 is slidably accommodated, and thence to the orifice 31. The flow of fluid past the member 33 produces across the latter a fluid pressure difference the force due to which tends to urge the member 33, and thus the armature 14, towards its first limit position in opposition to the solenoid force. This tends to re-seal the orifice 31, and thereby reduce the flow of fluid and thus the fluid pressure difference force acting on member 33. As a result, the solenoid force tends to become effective again so that the flow of fluid tends to increase again until a state of equilibrium is reached in which the solenoid force is balanced at a position between said first and second limit positions by the sum of the fluid pressure difference force and the force of the springs 15 and 37, to maintain the armature 14 at a position, generally as shown in FIG. 1, which gives a selected fluid flow rate. The spring 15 is weak compared with the spring 37, so that the force exerted thereby on the armature 14 is small compared with the force exerted by spring 37.

In each of the alternative constructions of the solenoid valve mechanism shown in FIGS. 2 and 3, the elements have been given the same reference last two digits as their counterparts in the mechanism 1 shown in FIG. 1. Each element in FIG. 2 has a reference number with a "12" for the first digit. The first digit is "3" in the reference numbers for FIG. 3 similar elements in FIGS. 1 and 2 and have the same last two digits. These two mechanisms are shown in their unenergised condition. The main operational difference between both the mechanisms of FIGS. 2 and 3 and that shown in FIG. 1 is that the slide member 33 has an initial free limited displacement, when a fluid pressure difference force acts on it, before engaging with the armature 14 to control displacement thereof to the fluid flow control position. This initial limited displacement results in an initially high dumping rate of fluid through the solenoid valve mechanism, when it is energised, before the dumping rate is lessened to the selected constant rate.

More specifically, in the solenoid valve mechanism shown in FIG. 2, the member 233 is annular (the armature 214 extending through its centre), and in the unenergised condition of the mechanism it is biassed out of engagement with the shoulder (or flange) 234 of the armature 214 by means of a weak bias spring 244. When the mechanism is energised to unseal orifice 231, there is an initial (uncontrolled) displacement of fluid which carries the member 233 against its spring biassing into engagement with the armature shoulder 234. In this mechanism the spring 215 acts between the armature 214 and the valve member 216, being co-axial with the main spring 237, to urge the armature 214 into its first limit position when the valve member is seated in the orifice 231 by the action of the spring 237. In the solenoid valve mechanism shown in FIG. 3, the member 233 is a disc with a central aperture and is located at the inlet end of the armature 314.

As in FIG. 2, the spring 315 acts between the armature 314 and the valve member 316, being co-axial with the main spring 337, the spring 337 also serving in this mechanism to maintain the member 333 displaced from the end of the armature 314 when the mechanism is unenergised. When the mechanism is energised to unseal orifice 331, there is an initial (uncontrolled) displacement of fluid due to the member 333 being displaced against the force of spring 337 and into engagement with the end of the armature 314 by the fluid pressure at the inlet port 340. The orifice 339 in the member 333 is a centre orifice near the inlet port 340.

What we claim is:

1. A solenoid valve mechanism comprising a cooperating poppet and valve seat, a first bias spring for urging said poppet into sealing engagement with said valve seat, a solenoid armature carrying said poppet and including first means for selectively urging said poppet against said spring bias, a solenoid coil cooperating with said solenoid armature, said armature being provided with fluid sealing means and a second bias spring for urging said armature into a first position in which said fluid sealing means forms a fluid seal around said poppet and said valve seat, said first means urging said poppet against said spring bias only after an initial axial displacement of the armature from said first position, said initial axial displacement being caused by a solenoid force produced on energization of said solenoid coil, said mechanism further including second means for bleeding fluid intermediate said (1) cooperating poppet and valve seat and (2) said fluid sealing means when said mechanism is unenergized, said armature being dimensioned so that upon said initial displacement said fluid seal is broken; said armature, said poppet and said first means cooperatively engaging following said initial displacement and upon further axial displacement of the armature away from said first position to displace said poppet from said valve seat.

2. A solenoid valve mechanism as claimed in claim 1 including a flow measuring member which is displaceable by a force produced by a fluid pressure difference across it due to flow of fluid through the mechanism when the latter is energized, said flow measuring member being effective on such displacement to displace said armature against said solenoid force so as to tend to cause said valve member to seal said orifice, the fluid flow rate being thereby held at a substantially constant value at which said force produced by said fluid pressure difference is substantially equal to said solenoid force minus the force of said bias springs.

* * * * *